United States Patent
Ohe et al.

(10) Patent No.: US 8,274,604 B2
(45) Date of Patent: Sep. 25, 2012

(54) IMAGE DISPLAY UNIT

(75) Inventors: Takayuki Ohe, Saitama (JP); Soichiro Niho, Kanagawa (JP)

(73) Assignee: Sony Corporation (JP)

( * ) Notice: Subject to any disclaimer, the term of this patent is extended or adjusted under 35 U.S.C. 154(b) by 449 days.

(21) Appl. No.: 12/583,910

(22) Filed: Aug. 27, 2009

(65) Prior Publication Data

US 2010/0060785 A1 Mar. 11, 2010

(30) Foreign Application Priority Data

Sep. 4, 2008 (JP) ................ P2008-226741

(51) Int. Cl.
*H04N 7/01* (2006.01)
(52) U.S. Cl. .............. 348/448; 348/441; 348/458
(58) Field of Classification Search ............ 348/452, 348/441, 447, 448, 451, 443, 449, 620, 558, 348/458–459; *H04N 11/20, 7/01*
See application file for complete search history.

(56) References Cited

U.S. PATENT DOCUMENTS

| 6,222,589 B1 * | 4/2001 | Faroudja et al. | 348/448 |
| 6,836,293 B2 * | 12/2004 | Itoh et al. | 348/452 |
| 2005/0248972 A1 | 11/2005 | Kondo et al. | |

FOREIGN PATENT DOCUMENTS

| JP | 11243507 A | 9/1999 |
| JP | 3385530 A | 3/2003 |
| JP | 2004317928 A | 11/2004 |
| JP | 2005-130286 A | 5/2005 |
| JP | 2006133741 A | 5/2006 |
| JP | 3788394 B2 | 6/2006 |
| JP | 2006285270 A | 10/2006 |
| JP | 2007155840 A | 6/2007 |
| JP | 2008079288 A | 4/2008 |
| JP | 2008136226 A | 6/2008 |

OTHER PUBLICATIONS

Office Action from Japanese Application No. 2008-226741, dated Jun. 1, 2010.
Office Action from Japanese Application No. 2008-226741, dated Feb. 2, 2011.
Office Action from Japanese Application No. 2008-226741, dated Sep. 28, 2010.
Office Action from Japanese Application No. 2010-150925, dated Feb. 23, 2012.

* cited by examiner

*Primary Examiner* — Trang U Tran
(74) *Attorney, Agent, or Firm* — Lerner, David, Littenberg, Krumholz & Mentlik, LLP

(57) ABSTRACT

A image display unit is allowed to reproduce display characteristics substantially equivalent to that obtained with use of a cinema projector, when performing a image display based on a film image signal or an equivalent. The image display unit including: an image insertion section inserting an interpolation frame image into an input video signal as the film image signal or the equivalent; and a display section performing image display based on a video signal where the interpolation frame image is inserted. The image insertion section generates an optimized image as the interpolation frame image in which the insertion time period and the signal level are optimized based on display characteristics to be achieved in a projected image projected with the cinema film by a cinema projector, thereby to insert the optimized image into the input video signal at a position corresponding to a gap between frames of the cinema film.

5 Claims, 4 Drawing Sheets

● : IMAGE POSITION IN 60Hz OPERATION

IMAGE DISPLAY UNIT

CROSS-REFERENCE TO RELATED APPLICATION

The present application claims priority from Japanese Patent Application No. JP 2008-226741 filed in the Japanese Patent Office on Sep. 4, 2008, the entire content of which is incorporated herein by reference.

BACKGROUND OF THE INVENTION

1. Field of the Invention

The present invention relates to an image display unit to which a film image signal generated based on a cinema film is inputted as a video signal.

2. Description of the Related Art

In general, in motion picture photography, still images are recorded in a cinema film at a frame rate of 24 frames per second. In a movie theater, moving picture is displayed by sequentially projecting the cinema film at a rate of 24 frames per second by a cinema projector. That is, movie display at a frame rate of 24 frames/sec (24 Hz) is performed.

Meanwhile, a frame rate of an ordinary TV (television) signal is 50 frames/sec (50 Hz) or 60 frames/sec (60 Hz). Thus, in the past, processing referred to as television cinema conversion (telecine conversion) in which, for example, a film image signal with 24 frames/sec is converted to a signal format of the ordinary TV signal has been performed. Examples of telecine conversion include 2-2 pulldown and 2-3 pulldown. For example, in the case where a film image signal with 24 frames/sec is converted to an image signal with 60 frames/sec, 2-3 pulldown is used. For example, where the first frame image in film images is A and the next second frame image in the film images is B, in 2-3 pulldown, image sequence "AB" in the film images is converted to image sequence "AABBB" in 60 frame images. That is, 2 frame images are generated from the first frame image of the film images, and 3 frame images are generated from the next second frame image, and thereby 5 frame images are generated from 2 frame images. By performing the same conversion for 24 frames, 60 frame images are generated. Such 60 frame images are contained in 1 second display time period, and thereby a signal format with 60 frames/sec is obtained. Similarly, in 2-2 pulldown, processing is performed so that image sequence "AB" in film images is converted to image sequence "AABB." That is, in 2-2 pulldown, 2 frame images are sequentially generated from each frame image of the film images.

The signal that is provided with pulldown processing has a feature in the image array. Thus, in an equipment of reproducing a picture, it is possible to detect that an input video signal is a film image signal generated based on a cinema film by detecting the image array. Such a technique is referred to as film detection, which has been known in the past as described in Japanese Unexamined Patent Application Publication No. 2005-130286.

A video signal inputted to a TV receiver or the like is outputted by being converted to a TV signal with 50 Hz or 60 Hz in a stage of being transmitted from a broadcast station or a stage of being transmitted from a VCR, even though the original picture thereof is a cinema film image.

Meanwhile, in recent years, audiovisual environment of a motion picture content in an ordinary household easily has similarity to cinema film showing in a movie theater. For example, with regard to size and definition degree of screen, a large and horizontally long TV display with high definition has been commonly used in ordinary households. Further, as a display method of a TV display, liquid crystal display method has been commonly used instead of CRT (cathode-ray tube) method. Thereby, instead of the interlace scan method that has been used in the existing CTRs, display with the use of progressive method has been commonly used. Therefore, in recent years, in a TV receiver or the like, even if an input video signal has not been converted to a TV signal with 50 Hz or 60 Hz, a film image signal with 24 frames/sec is allowed to be displayed at the original frame rate. Such a display method is referred to as 24p reproduction or the like. 24p reproduction is performed, for example, in the case where a 1080p24 signal is inputted with the use of HDMI (High Definition Multimedia Interface) input.

As described above, in recent years, in a liquid crystal TV or the like, display on a big screen with high definition at the same frame rate as that of a cinema film has been enabled, and thus the household audiovisual environment easily has similarity to that of cinema film showing in a movie theater. Meanwhile, a panel device of a liquid crystal TV or the like is a so-called hold type display. Thus, in a picture with 24 frames/sec such as a motion picture content, judder is easily visible. Visibility degree of judder is increased in the bigger screen, leading to sense of discomfort. In the hold type display, once an image is displayed, such a displayed image is continuously displayed until the next image is displayed. That is, in the case where picture does not change between frames, data is not refreshed, and the same picture is continuously displayed. Thus, if a subject moves at a time of switching between frames, the subject is seen as a double image due to human visual feature. Such a phenomenon is called judder.

SUMMARY OF THE INVENTION

In a cinema projector, at the moment of projecting an arbitrary 1 frame of a film, such a frame is projected while the frame stays in a given position in the cinema projector. In order to switch to the next frame, film advance (frame advance) should be performed. During such film advance, light of a projection lamp is shielded by a rotary shutter and nothing is projected on the screen momentary. Subsequently, when the next frame of the film is film-advanced to a given position in the cinema projector and switching between frames is perfectly completed, the rotary shutter is opened and the relevant frame is projected on the screen. As described above, in the cinema projector, movement that every 1 frame of the cinema film is stopped and sent is immediately repeated. Further, a time period between each frame (film advance moment) becomes a shutter time period by the rotary shutter, and thus a black screen is momentary displayed at this time. In cinema film showing in a movie theater, judder is also generated. However, due to the foregoing principle of film showing, when the shutter is released in a time period between frames, a black screen is momentary displayed. Thus, sense of discomfort caused by judder is considerably reduced.

Therefore, in the hold type display of a liquid crystal TV or the like, it may be possible to adopt a method to inhibit influence of judder by repeatedly and alternately displaying every 1 frame of a real screen and a black screen. However, if every 1 frame of a real screen and a black screen is repeatedly and alternately displayed simply, the following disadvantages are generated:

1. Luminance of the picture is largely deteriorated.
2. Judder is viewed differently from that of a picture viewed in a movie theater.

Japanese Patent Nos. 3788394 and 3385530 disclose a drive method of alternately displaying a data screen and a black screen in order to decrease vision persistence generated in a liquid crystal display unit. However, in such a method, it is not possible to realize display considering display characteristics (light emission characteristics) shown in the case where a cinema film is projected by a cinema projector. Thus, in particular, in the case where a moving picture based on a film image signal is displayed, there is a disadvantage that the moving picture is viewed differently from that of the case where a motion picture is projected by a cinema projector.

In view of the foregoing, in the invention, it is desirable to provide a image display unit capable of obtaining display characteristics of a image display close to the display characteristics by a cinema projector in the case where a film image signal generated based on a cinema film or an image signal equal thereto is inputted as a video signal.

According to an embodiment of the invention, there is provided an image display unit including: an image insertion section inserting an interpolation frame image into an input video signal, the input video signal being a film image signal generated based on a cinema film or being an image signal which is captured by a digital cinematography camera and is equivalent to the film image signal; and a display section performing image display based on a video signal configured by inserting the interpolation frame image into the input video signal. The image insertion section generates an optimized image as the interpolation frame image in which the insertion time period and the signal level are optimized based on display characteristics which is to be achieved in a projected image projected with the cinema film by a cinema projector, thereby to insert the optimized image into an insert position in the input video signal, the insert position corresponding to a gap between frames of the cinema film.

In the embodiment of the present invention, "film image signal" is not limited to a film image signal of a film picture with a signal format of, for example 24 frames per second, that is, is not limited to a film image signal with a frame rate of 24 Hz. For example, "film image signal" may be a video signal generated by providing the 24 Hz film image signal with pulldown processing. For example, "film image signal" may be a video signal obtained by frame-rate converting the 24 Hz film image signal to 60 Hz by 2-3 pulldown.

In the image display unit of the embodiment of the invention, an interpolation frame image is inserted into an input video signal, the input video signal being a film image signal generated based on a cinema film or being an image signal which is captured by a digital cinematography camera and is equivalent to the film image signal. The optimized image is inserted as the interpolation frame image in which the insertion time period and the signal level are optimized based on display characteristics which is to be achieved in a projected image projected with the cinema film by a cinema projector. The optimized image is inserted into an insert position in the input video signal, the insert position corresponding to a gap between frames of the cinema film.

More specifically, for example, the optimized image is an image in which the insertion time period and the signal level are optimized so that the signal level is black level, and so that the insertion time period is shorter than a shutter-close period of the cinema projector, the shutter-close period corresponding to the gap between frames in cinema film.

In this case, since the insertion time period of the interpolation frame image is optimized to be the time period shorter than the shutter-close period of the cinema projector, display considering human visual feature is performed, and impression received by a viewer is easily close to a case of film showing by the cinema projector.

Further, for example, the optimized image is an image in which the insertion time period and the signal level are optimized so that the insertion time period is equal to a shutter-close period synchronized with a period between frames in cinema film, and so that the signal level is lower than a signal level of a frame image immediately before a insertion position where the interpolation frame image is to be inserted.

In this case, since the signal level of the interpolation frame image is optimized to be lower than the signal level of the frame image immediately before a insertion position where the interpolation frame image is to be inserted, display considering human visual feature is performed, and impression received by a viewer is easily close to a case of film showing by the cinema projector. Further, compared to changing the insertion time period, changing the signal level is relatively easy. Thus, display of the interpolation frame image may be changed according to, for example, audiovisual environment. Thereby, even if image display is performed in an ordinary household in which, for example, the audiovisual environment is brighter than that of a movie theater, impression received by a viewer is easily close to that of film showing by the cinema projector.

According to the image display unit of the embodiment of the invention, the interpolation frame image is inserted into an input video signal, the input video signal being a film image signal generated based on a cinema film or being an image signal which is captured by a digital cinematography camera and is equivalent to the film image signal. The optimized image is generated and inserted as the interpolation frame image in which the insertion time period and the signal level are optimized based on display characteristics which is to be achieved in a projected image projected with the cinema film by a cinema projector. Thereby, in the case where the film image signal generated based on the cinema film is inputted as a video signal, the display characteristics of the image display may close to the display characteristics by the cinema projector.

Other and further objects, features and advantages of the invention will appear more fully from the following description.

DETAILED DESCRIPTION OF THE PREFERRED EMBODIMENTS

Embodiments of the invention will be hereinafter described in detail with reference to the drawings.

FIRST EMBODIMENT

Configuration of Image Display Unit

Figure 1:
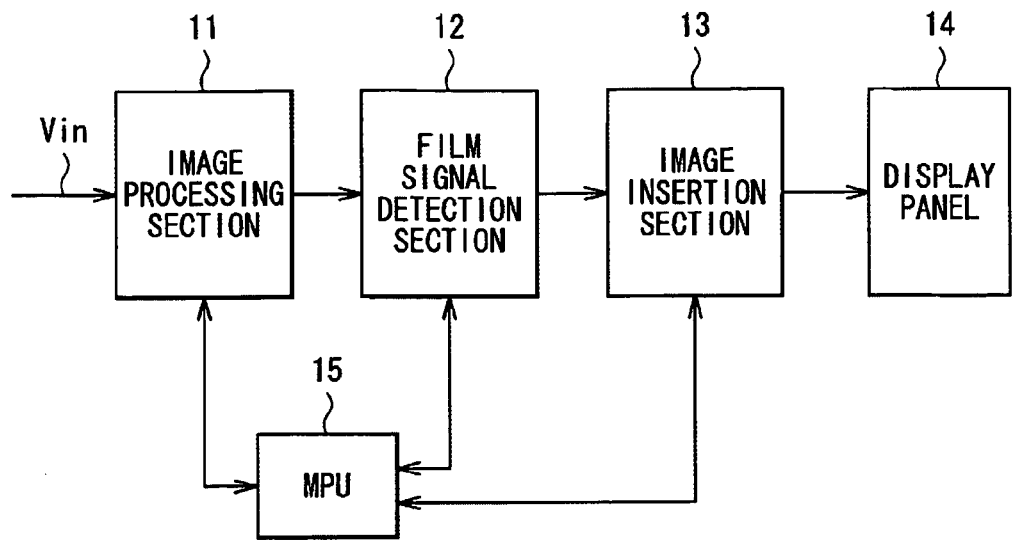
FIG. 1 is a block diagram illustrating an example of whole configuration of an image display unit according to a first embodiment of the invention.

FIG. 1 illustrates an example of whole configuration of an image display unit according to a first embodiment of the invention. The image display unit includes an image processing section 11 for performing given image processing for an input video signal Vin and a film signal detection section 12 for detecting whether or not the input video signal Vin is a film image signal. The image display unit further includes an image insertion section 13 for performing processing of inserting an interpolation frame image in the case where the input video signal Vin is the film image signal, and a display panel 14 for performing image display based on a video signal outputted from the image insertion section 13. The image display unit further includes an MPU (Micro Processor Unit) 15 that is connected to and communicates with the image processing section 11, the film signal detection section 12, and the image insertion section 13.

The display panel 14 is a hold type display panel, and is composed of, for example, a liquid crystal display panel. In this embodiment, the display panel 14 corresponds to a specific example of "display section" in the invention.

In this embodiment, "film image signal" represents a general signal generated based on a cinema film, and is not limited to a film image signal of a film picture with a signal format of, for example, 24 frames per second, that is, is not limited to a film image signal with a frame rate of 24 Hz. For example, "film image signal" in this embodiment may be a video signal obtained by frame-rate converting the film image signal with 24 Hz by 2-2 pulldown.

As described above, the signal provided with 2-2 pulldown processing or 2-3 pulldown processing has a feature in the image array. It is possible to detect that the input video signal Vin is a film image signal generated based on a cinema film by detecting characteristics of the image array. Such a film detection technique has been heretofore known. The film signal detection section 12 detects whether or not the input video signal Vin is a signal provided with pulldown processing by such a film detection technique. The detection result in the film signal detection section 12 is notified to the image insertion section 13. Further, for example, as a 1080p24 signal with the use of HDMI input, there is a case that the film image signal with a frame rate of 24 Hz is inputted as the input video signal Vin. The MPU 15 has a function to detect the signal format of the input video signal Vin, detects that the film image signal with the use of HDMI input as above is inputted, and notifies the detection result to the image insertion section 13.

The image insertion section 13 performs processing of inserting the interpolation frame image into the input video signal Vin in the case where detection is made that a film image signal is inputted as the input video signal Vin in the film signal detection section 12 or the MPU 15. The image insertion section 13 inserts the interpolation frame image into a section corresponding to a gap between each frame of the cinema film in the input video signal Vin. Further, the image insertion section 13 inserts an image in which an insertion time period and a signal level are optimized based on display characteristics in projecting the cinema film by a cinema projector as the interpolation frame image.

Operation of Image Display Unit

Next, a description will be given of operation of the image display unit according to this embodiment.

In the image display unit, the input video signal Vin is inputted to the film signal detection section 12 through the image processing section 11. The film signal detection section 12 detects whether or not the input video signal Vin is a signal provided with pulldown processing, and outputs the result thereof together with the input video signal Vin to the image insertion section 13. Further, the MPU 15 detects the signal format of the input video signal Vin, for example, detects that a film image signal such as 1080p24 is inputted, and notifies the detection result to the image insertion section 13. In the case where the input video signal Vin is a film image signal, the image insertion section performs processing of inserting an interpolation frame image, and outputs the result to the display panel 14. In the case where the input video signal Vin is not a film image signal, the image insertion section 13 does not perform processing of inserting an interpolation frame image, and outputs the input video signal Vin to the display panel 14. In the display panel 14, a image display based on the video signal outputted from the image insertion section 13 is performed.

Figure 2:
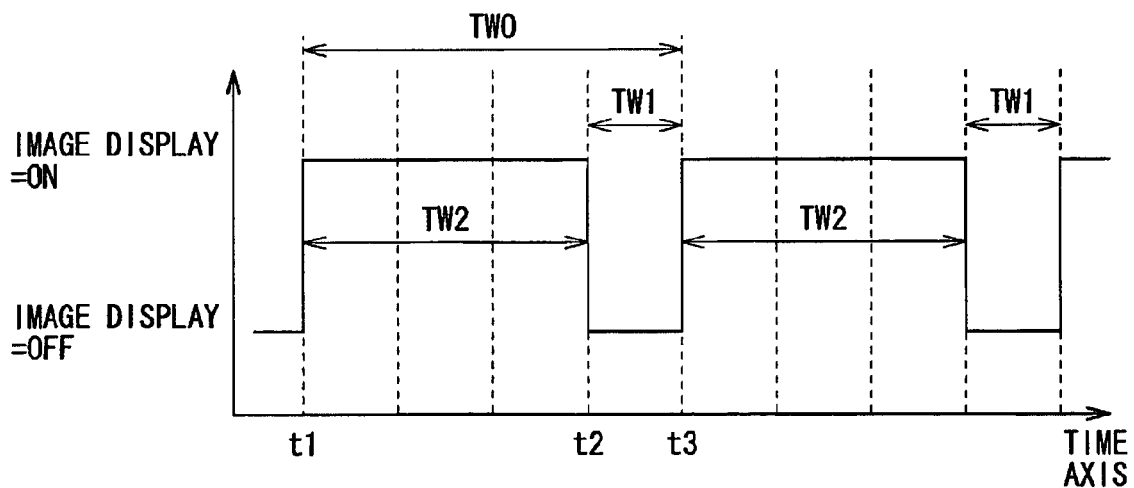
FIG. 2 is a waveform diagram illustrating an example of display timing of a cinema projector.

A description will be hereinafter specifically given of the insertion processing of the interpolation frame image performed in the image insertion section 13. FIG. 2 illustrates an example of display timing in the case where a cinema film is projected by a cinema projector. In FIG. 2, the horizontal axis indicates time, and the vertical axis indicates a display state of the picture (corresponding to a signal level). For giving a brief description, image display states include two states, one thereof is on-state of image display of the cinema film (for example, state corresponding to the state that the signal level is white level) and off-state of image display of the cinema film (state corresponding to the state that the signal level is black level). In FIG. 2, TW0 corresponds to 1 frame time period of the cinema film. For example, in the case of a film format with 24 frames/sec (24 Hz), TW0 is 1/24 sec (24 Hz). In a cinema projector, a time period between each frame (moment of film advance) is a shutter time period by a rotary shutter, resulting in a black screen momentarily. TW1 represents the shutter time period. TW2 represents a time period obtained by subtracting the shutter time period TW1 from the time period TW0, and represents a image display time period in which the picture is projected on the screen for real. The shutter time period TW1 is, for example, 1/96 sec (96 Hz).

In projection by the cinema projector, such a shutter time period TW1 exists, the screen momentarily turns into a black screen when shutter is released in such a time period between frames, and thus sense of discomfort due to judder is considerably decreased. Therefore, it is enough that in the image insertion section 13, for example, an interpolation frame image reproducing the display characteristics of the shutter time period TW1 is generated and inserted. That is, simply stated, it is enough that an interpolation frame image in which the signal level is black level and the insertion time period (frame time period) is the same as the shutter time period TW1 is generated and inserted. In this case, if the shutter time period TW1 is 1/96 sec, it is enough that a circuit having signal processing capability of 96 Hz or more is used as the image insertion section 13.

Figure 3:
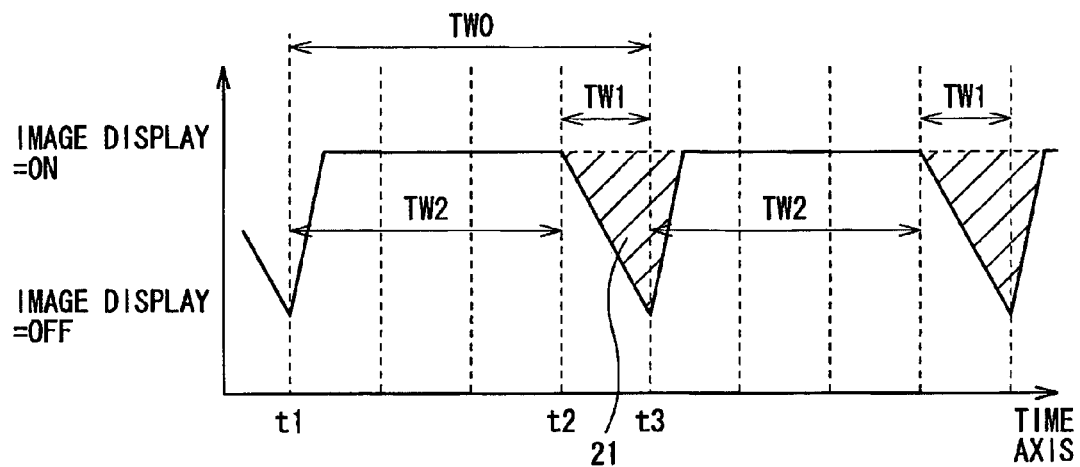
FIG. 3 is a waveform diagram schematically illustrating display characteristics of the cinema projector considering human visual feature.

In the display timing illustrated in FIG. 2, human visual feature are not considered. Thus, FIG. 3 schematically illustrates display characteristics of a cinema projector considering the human visual feature. In FIG. 2 and FIG. 3, the shutter time period TW1 that is started at time t2 and is finished at time t3 is examined. Human eyes have vision persistence characteristics. Thus, even if the rotary shutter is released at the time t2, stimulation given to human eyes is not immediately extinguished as expressed in FIG. 2 in which the white level is instantly decreased down to the black level at the time t2, but the stimulation given to human eyes is gradually extinguished as expressed in FIG. 3 in which the signal level is gradually decreased. Further, since there is a slight time lag until the rotary shutter starts to be opened perfectly at the time t3, the stimulation given to human eyes is gradually increased as expressed in FIG. 2 in which the signal level is gradually increased in the vicinity of the time t3. Thus, considering the visual characteristics, a section indicated by a region 21 is a region that is not recognized as a picture by human eyes. In order to reproduce the same vision as that of motion picture showing in a real movie theater, it is preferable that a picture waveform as illustrated in FIG. 3 considering the visual characteristics is realized.

Figure 4:
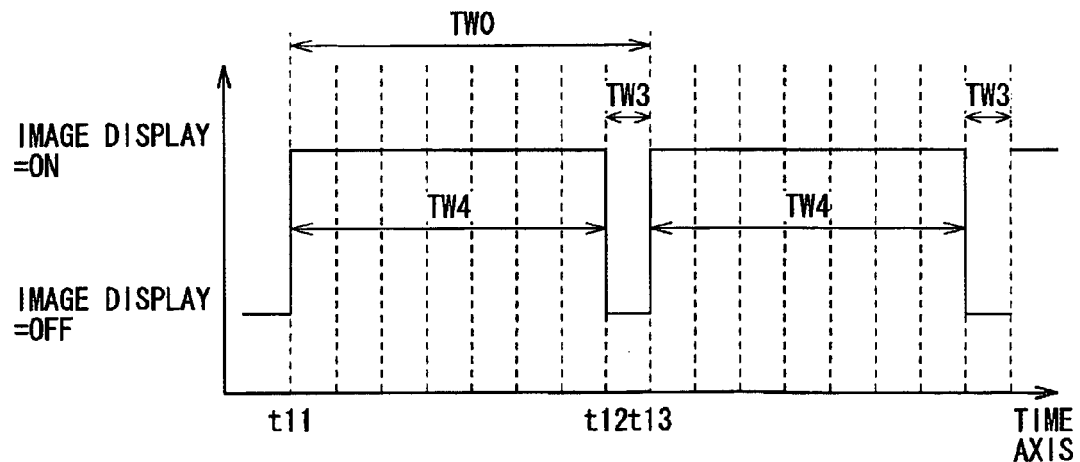
FIG. 4 is a waveform diagram illustrating a signal output waveform in the image display unit according to the first embodiment of the invention.

However, it is difficult to perfectly reproduce a picture waveform having a diagonal signal waveform as illustrated in FIG. 3 by inserting an interpolation frame image. Thus, instead of the picture waveform illustrated in FIG. 3, a picture waveform as illustrated in FIG. 4 may be reproduced. In FIG. 2 to FIG. 4, each scale of each axis is identical. That is, it is enough that in the image insertion section 13, as an interpolation frame image, an image in which the signal level is black level and the insertion time period is optimized to be time period TW3 shorter than the shutter time period TW1 is inserted. In FIG. 4, TW4 represents a time period obtained by subtracting the insertion time period of the interpolation frame image TW3 from the time period TW0, and represents a image display time period in which a picture of an original film image is displayed on the display panel 14 for real. If the shutter time period TW1 illustrated in FIG. 2 and FIG. 3 is 1/96 sec (96 Hz), the optimized insertion time period TW3 in FIG. 4 is, for example, 1/192 sec (192 Hz) obtained by doubling the time period TW1. Therefore, in order to realize a signal waveform as illustrated in FIG. 4, it is enough that a circuit having signal processing capability of 192 Hz or more is used as the image insertion section 13.

As described above, according to the image display unit according to this embodiment, in the case where the input video signal Vin is the film image signal, the interpolation frame image is inserted into the section corresponding to the gap between each frame of the cinema film. Further, as the interpolation frame image, the image in which the insertion time period and the signal level are optimized based on the display characteristics of the cinema projector is inserted. Thereby, in the case where the film image signal is inputted as the video signal Vin, the display characteristics of the image display is allowed to be close to the display characteristics by the cinema projector.

Further, by using the image display unit according to this embodiment as a television receiver used in a household or the like, viewers' impression received in viewing a television picture in a household or the like is allowed to be close to viewers' impression received in viewing a picture shown in a movie theater. Thereby, in households, audiovisual experience with realistic sensation similar to that of the case of appreciating a work in a movie theater is enabled. Further, for the detection technology of the film image signal and the picture technology of inserting the interpolation frame image themselves that are used in the image display unit according to this embodiment, technologies that have been generally used are applicable thereto. That is, the circuit configuration itself in the image display unit according to this embodiment is achievable by using the technologies that have been generally used in the past in combination with each other, and is achievable without significantly increasing the circuit size compared to that of existing cases.

SECOND EMBODIMENT

Next, a description will be given of an image display unit according to a second embodiment of the invention. For the practically same elements as those of the image display unit according to the foregoing first embodiment, the same referential symbols are affixed thereto, and the description thereof will be omitted as appropriate.

The basic circuit configuration of the image display unit according to the this embodiment is the same as that of FIG. 1, but is different from that of FIG. 1 in the interpolation frame image generated by the image insertion section 13. In the foregoing first embodiment, the display characteristics of the cinema projector considering the visual characteristics (FIG. 3) is realized by inserting the interpolation frame image of the black level. At this time, the insertion time period (frame time period of the interpolation frame image) is optimized to be the time period TW3 shorter than the shutter time period TW1 (FIG. 4). However, in order to realize the technique illustrated in FIG. 4, as a circuit configuration, for example, a circuit having high processing capability of 192 Hz or more is necessitated. In this embodiment, the display characteristics of the cinema projector considering the visual characteristics are achievable at low cost without using the circuit having such high processing capability.

Figure 5:
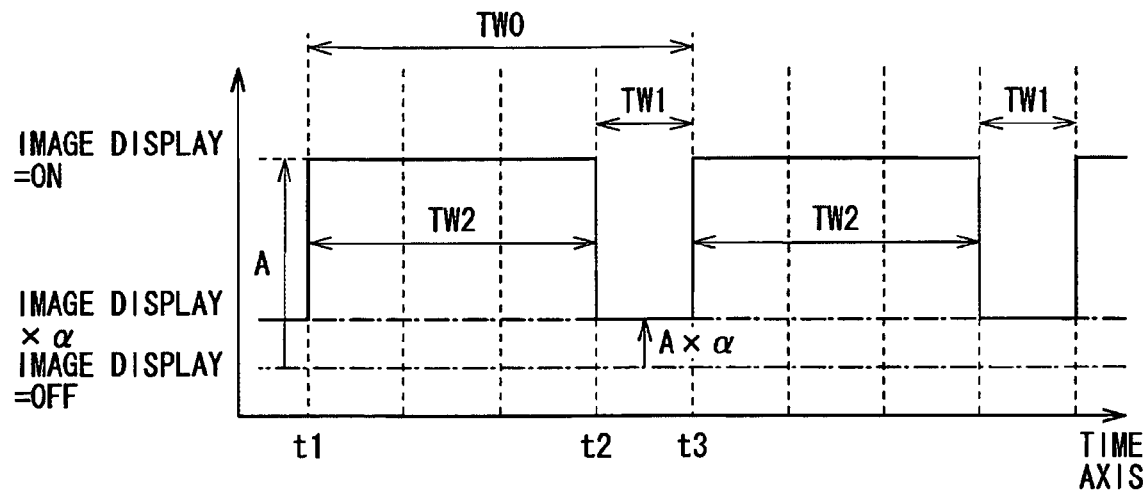
FIG. 5 is a waveform diagram illustrating a signal output waveform in an image display unit according to a second embodiment of the invention.

FIG. 5 illustrates a signal waveform generated in the case where the input video signal Vin is a film image signal in the image display unit according to this embodiment. In FIG. 5, each scale of each axis is identical with that of FIG. 2 to FIG. 4. In this embodiment, in the image insertion section 13, an image in which the signal level is optimized to be lower than the signal level of the image immediately before inserting an interpolation frame image is inserted as the interpolation frame image. The insertion time period thereof is optimized to be the same as the shutter time period TW1. For example, as illustrated in FIG. 5, where the signal level of the image immediately before inserting the interpolation frame image is A, a signal with signal level of $A*\alpha$ obtained by multiplying A by $\alpha$ ($\alpha$ is a coefficient smaller than 1) is inserted as the interpolation frame image. By inserting the signal with such a signal level, even though the insertion time period is the same as the shutter time period TW1, display characteristics equal to the display characteristics of the cinema projector considering the visual characteristics (FIG. 3) are obtainable. In this case, if the shutter time period TW1 is 1/96 sec, it is enough that a circuit having signal processing capability of 96 Hz or more is used as the image insertion section 13. That is, compared to the case that the insertion time period is optimized to be the time period TW3 shorter than the shutter time period TW1 as in the foregoing first embodiment, the circuit with lower signal processing capability is usable.

Particularly different points between audiovisual environment in an actual movie theater and audiovisual environment in a household room are: 1) screen size; and 2) brightness of environment. Accordingly, there are following disadvantages:

1. The larger a screen size (screen ratio in a human visual range) is, the easier judder is sensed.

2. Compared to a movie theater without reflected light except for a screen, in general, in the household environment, due to lighting, outside light, walls, or furniture, reflected light thereof exist. Thus, the screen itself displayed on the display is demanded to be lighter than that of film showing in the movie theater. Therefore, even if the insertion time period of an interpolation frame image is the same as the shutter time period TW1 in the movie theater, the screen are easily sensed dark in the household environment.

Taken the foregoing disadvantages 1 and 2 together, in the household environment, by inserting a black screen in a time period shorter than the black screen time period by a rotary shutter in cinema film showing (shutter time period TW1), image display having judder giving impression similar to that in the movie theater is able to be realized while brightness of the screen is retained. Such a technique is illustrated in FIG. 4. However, it is difficult to arbitrarily adjust the insertion time period of the black screen since high processing capability is demanded as a circuit. Meanwhile, according to the technique illustrated in FIG. 5, by adjusting the foregoing coefficient α as appropriate, a judder amount optimized considering the foregoing disadvantages 1 and 2 may be easily reproduced. That is, according to the image display unit according to this embodiment, by adjusting the coefficient α as appropriate, image display more suitable for the household audiovisual environment is easily achievable.

THIRD EMBODIMENT

Next, a description will be given of an image display unit according to a third embodiment of the invention. For the practically same elements as those of the image display unit according to the foregoing first or the foregoing second embodiment, the same referential symbols are affixed thereto, and the description thereof will be omitted as appropriate.

In the display technique in the foregoing first embodiment (FIG. 4) and the display technique in the foregoing second embodiment (FIG. 5), the interpolation frame image is inserted into the section corresponding to a gap between each frame of the cinema film. In this case, in the case of a film image signal in which the signal format of the input video signal Vin is, for example, 1080p24, a structure of each frame (frame structure) is totally the same as that of a cinema film, and thus the interpolation frame image may be simply inserted into the section corresponding to a gap between each frame. Further, in the case where the input video signal Vin is provided with 2-2 pulldown processing, each frame structure is practically the same as that of a cinema film, and thus processing is enabled similarly. That is, in the signal provided with 2-2 pulldown processing, 2 frame images are generated from 1 frame, and thus the picture is switched in a cycle of 2 frames. Such 2 frame cycle is equal to 1 cycle of the cinema film (for example, 24 Hz). Therefore, by inserting an interpolation frame image for every 2 frame time period, the display characteristics by a cinema projector may be practically reproduced.

Figure 6:
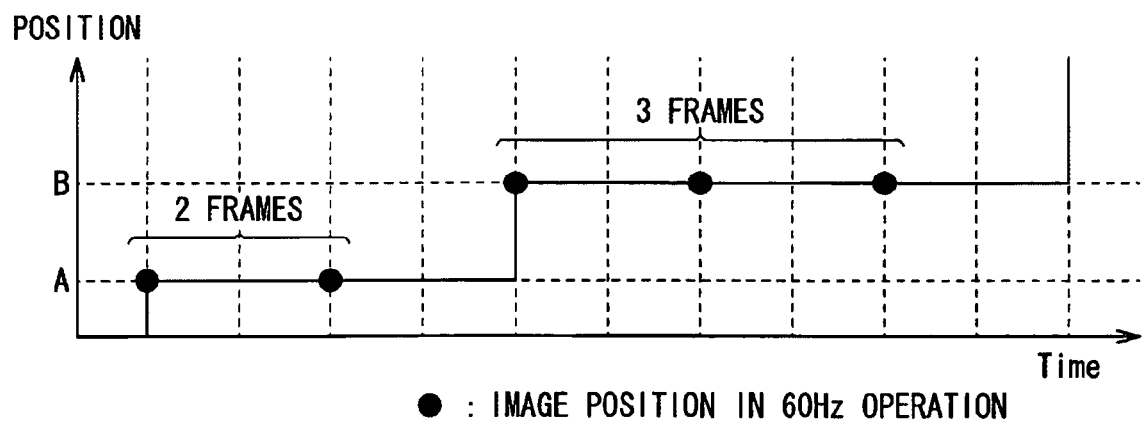
FIG. 6 is an explanation diagram illustrating a frame structure of a film image signal provided with 2-3 pulldown.

Meanwhile, in the case of a signal provided with 2-3 pulldown processing, the picture is not switched in the simple cycle as that of the 2-2 pulldown processing, and thus an interpolation frame image may not be simply inserted in a cycle of 24 Hz. FIG. 6 schematically illustrates an image structure (frame structure) of a signal provided with 2-3 pulldown processing. In 2-3 pulldown processing, for example, a film image signal with 24 frames/sec is converted to an image signal with 60 frames/sec. For example, where the first frame image in the original film images is A and the next second frame image of the original film images is B, in 2-3 pulldown, image sequence "AB" in the film images is converted to image sequence "AABBB" in 60 frame images. That is, 2 frame images are generated from the first frame image of the film images, and 3 frame images are generated from the next second frame image, and thereby 5 frame images are generated from 2 frame images.

In FIG. 6, images are moving images, and frame difference is represented by difference of image position. The signal provided with 2-3 pulldown processing has a picture switching cycle in which after 2 frame images are displayed, 3 frame images are displayed, and then 2 frame images are displayed. Thus, if no adjustment is provided, the picture switching cycle is different from the switching cycle of the original cinema film. Therefore, the signal provided with 2-3 pulldown processing is provided with double speed processing, and its picture switching cycle is adjusted to the switching cycle of the original cinema film.

Figure 7:
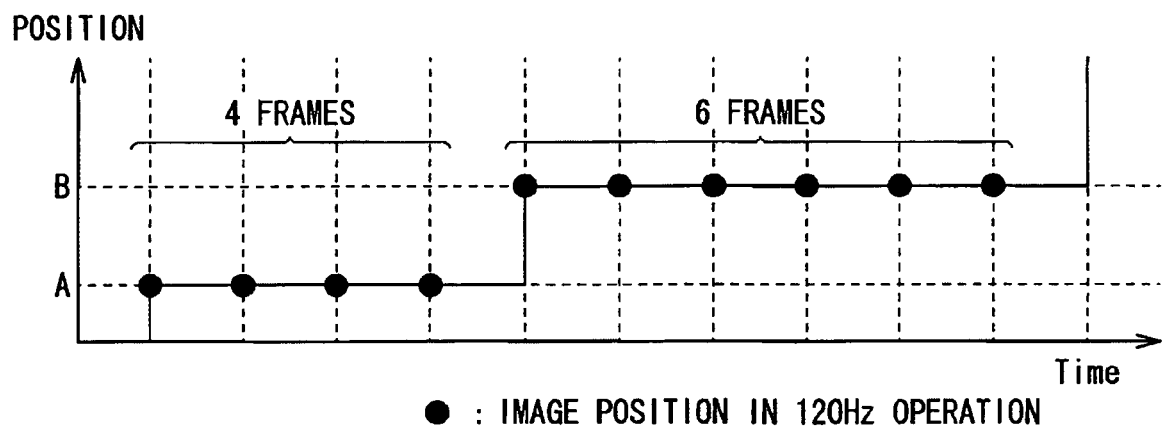
FIG. 7 is an explanation diagram illustrating a frame structure in the case where a frame rate of the film image signal provided with 2-3 pulldown is doubled by ordinary processing.

FIG. 7 schematically illustrates a frame structure in the case where the 2-3 pulldown signal with 60 Hz illustrated in FIG. 6 is simply provided with frame rate conversion to an image signal with 120 Hz. As illustrated in FIG. 7, if only double speed frame rate conversion is simply provided, picture switching is made after 4 frames time period and 6 frames time period in 120 Hz in cycles. That is, the switching cycle remains irregular.

Figure 8:
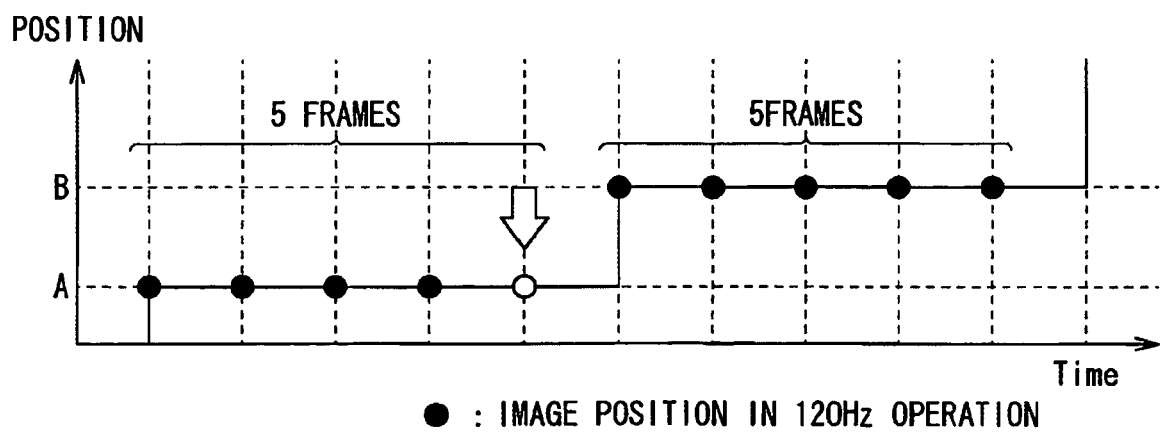
FIG. 8 is an explanation diagram illustrating a frame structure in the case where the frame rate of the film image signal provided with 2-3 pulldown is doubled to easily obtain display characteristics close to the display characteristics by the cinema projector.

Meanwhile, FIG. 8 schematically illustrates a frame structure in the case where the 2-3 pulldown signal with 60 Hz illustrated in FIG. 6 is provided with frame rate conversion to an image signal with 120 Hz so that the picture switching cycle becomes equal to the switching cycle of the cinema film. In FIG. 8, the simple double speed processing as illustrated in FIG. 7 is not provided, but 1 frame of picture is moved before, and the picture is cyclically switched after every 5 frame time period in 120 Hz. The 5 frame cycle is equal to 1 cycle of the cinema film (24 Hz). Thus, by inserting an interpolation frame image after every 5 frame time period, the display characteristics by the cinema projector may be practically reproduced. In the circuit configuration illustrated in FIG. 1, such frame rate conversion may be provided when, for example, the image insertion section 13 inserts an interpolation frame image.

OTHER EMBODIMENTS

The invention is not limited to the foregoing respective embodiments, and other modifications may be made.

For example, a display technique in which the foregoing first embodiment and the foregoing second embodiment are combined may be adopted. That is, an image in which the insertion time period is optimized to be a time period shorter than the shutter time period, and the signal level is optimized to be lower than the signal level of the image immediately before the relevant image may be inserted as an interpolation frame image.

Further, in the foregoing explanation, the description has been given of the case that the input video signal Vin is the film image signal generated based on the cinema film (silver salt film). However, the input video signal Vin may be an image signal generated by a digital device used in producing a so-called digital cinema. For example, the input video signal Vin may be a digital image signal having a frame structure practically equal to that of a cinema film that is generated by a digital video camera capable of capturing with the same number of frames (24 frames/sec) as that of the cinema film.

It should be understood by those skilled in the art that various modifications, combinations, sub-combinations and alternations may occur depending on design requirements and other factors insofar as they are within the scope of the appended claims or the equivalents thereof.

What is claimed is:

1. An image display unit comprising:
an image insertion section inserting an interpolation frame image into an input video signal, the input video signal being a film image signal generated based on a cinema film or being an image signal which is captured by a digital cinematography camera and is equivalent to the film image signal; and
a display section performing image display based on a video signal configured by inserting the interpolation frame image into the input video signal,
wherein the image insertion section generates an optimized image as the interpolation frame image in which the insertion time period and the signal level are optimized to reproduce same display characteristics which is to be achieved in a projected image projected with the cinema film by a cinema projector, thereby to insert the optimized image into an insert position in the input video signal, the display characteristics being determined in accordance with vision persistence characteristics of human eyes, the insert position corresponding to a gap between frames of the cinema film.

2. The image display unit according to claim 1, wherein the optimized image is an image in which the insertion time period and the signal level are optimized to reproduce the same display characteristics which is to be achieved in the projected image projected with the cinema film by the cinema projector during a shutter-close period, the shutter-close period being synchronized with a period between frames in cinema film.

3. The image display unit according to claim 1, wherein the optimized image is an image in which the insertion time period and the signal level are optimized so that the signal level is black level, and so that the insertion time period is shorter than a shutter-close period of the cinema projector, the shutter-close period corresponding to the gap between frames in cinema film.

4. The image display unit according to claim 1, wherein the optimized image is an image in which the insertion time period and the signal level are optimized so that the insertion time period is equal to a shutter-close period synchronized with a period between frames in cinema film, and so that the signal level is lower than a signal level of a frame image immediately before a insertion position where the interpolation frame image is to be inserted.

5. The image display unit according to claim 1, wherein the display section is a display panel of hold type.

* * * * *